United States Patent
McAfee

(10) Patent No.: US 7,761,546 B2
(45) Date of Patent: Jul. 20, 2010

(54) LOAD BALANCING ACCORDING TO AN ITERATIVE GREATEST COMMON DIVISOR APPROACH TO WEIGHT NORMALIZATION

(75) Inventor: Gary O. McAfee, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1460 days.

(21) Appl. No.: 11/113,793

(22) Filed: Apr. 25, 2005

(65) Prior Publication Data

US 2006/0242298 A1    Oct. 26, 2006

(51) Int. Cl.
*G06F 15/173*    (2006.01)
*G06F 12/00*    (2006.01)
*H04L 12/28*    (2006.01)

(52) U.S. Cl. .................. 709/223; 709/224; 709/225; 709/226; 370/254; 711/150

(58) Field of Classification Search ......... 709/223–226; 370/254; 711/150
See application file for complete search history.

(56) References Cited

U.S. PATENT DOCUMENTS 5,774,660 A * 6/1998 Brendel et al. .............. 709/201
5,774,668 A * 6/1998 Choquier et al. ............ 709/223
6,601,084 B1 * 7/2003 Bhaskaran et al. .......... 718/105

OTHER PUBLICATIONS

IP Virtual Server Netfilter module Version 1.0.1 for Linux Kernel 2.4 ChangeLog, Mar. 25, 2002, http://web.archive.org/web/20040118022328/http://www.lvserver.de/german/software/kernel-2.4/ChangeLog.*

* cited by examiner

*Primary Examiner*—William C Vaughn, Jr.
*Assistant Examiner*—Carlos R Perez Toro
(74) *Attorney, Agent, or Firm*—Joseph E. Bracken, Esq.; Steven M. Greenberg, Esq.; Carey, Rodriguez, Greenberg & Paul, LLP

(57) ABSTRACT

A method, system and apparatus for load balancing workloads in a cluster according to an iterative greatest common divisor approach to weight normalization. A load balancing method can include computing a greatest common divisor for a set of current normalized values for raw weights corresponding to endpoints in a cluster. Each of the current normalized values can be reduced by a factor proportionate to the greatest common divisor. The reduction can produce new normalized values for the raw weights corresponding to the endpoints in the cluster. The computing and reducing steps can be repeated for the new normalized values until the new normalized values are sufficiently low. Finally, workloads can be assigned to the endpoints in the cluster according to the new normalized values which are sufficiently low.

7 Claims, 2 Drawing Sheets

LOAD BALANCING ACCORDING TO AN ITERATIVE GREATEST COMMON DIVISOR APPROACH TO WEIGHT NORMALIZATION

BACKGROUND OF THE INVENTION

1. Statement of the Technical Field

The present invention relates to workload distribution in network computing and more particularly to weighted load balancing in a computer communications network.

2. Description of the Related Art

In the prototypical distributed system, content or logic services can be delivered from an origin server to a community of consuming clients. Services and content typically can be delivered according to a request-response paradigm in which the consuming clients initiate a request for services to which one or more origin servers can respond with the requested services. To accommodate a high volume of requests and the workloads resulting from those requests, groups of servers have been clustered together to act as a unified server to external clients. In this regard, any given request could be handled by any of several servers, thereby improving scalability and fault-tolerance.

The decision to route requests to different servers in a server farm can involve a variety of request routing methodologies. In particular, server selection methodologies can be selected in order to maximize throughput and minimize response latency. For instance, server load balancing oriented methodologies monitor server status and direct requests to lightly loaded servers. Notably, load balancing methodologies intend to distribute incoming workloads to achieve a strategic objective such as ensuring the high-availability of any one server in a cluster to support subsequent incoming workload requests.

Logic which distributes workloads within a network often do so according to "weights" which are applied to the homogenous end points in a cluster from among which load balancing algorithms select to handle incoming workloads. The weights describe the desirability of one endpoint over another, and often describe the ratio of workloads which should be routed to each endpoint in order to optimally load balance incoming workloads. For example, if a load balancer can select from among three homogeneous endpoints—A, B and C—and the weights assigned to these endpoints are 1, 2, and 3, respectively, then one-sixth of the workloads are to be routed to endpoint A, one third of the workloads are to be routed to endpoint B, and one half of the workloads are to be routed to endpoint C.

The weights of a set of endpoints can be applied by assigning a number of incoming workloads to each different endpoint such that the aggregate assignments satisfy the specified weights for the set of endpoints. To that end, the raw weighting of a set of endpoints can be amplified by a factor such that proportionally speaking, different endpoints can satisfy a different number of requests in a portion of total requests processed in the load balancer over a period of time. For instance, in a three endpoint cluster in which the raw weights are one, two and three respectively, the first ten workloads can be assigned to the first endpoint, the following twenty requests can be assigned to the second endpoint and the following thirty requests can be assigned to the third endpoint.

Load balancers often engage in a process known as "normalization". Normalization involves the reduction in amplitude of the number of requests assigned to any given endpoint while maintaining the raw weights of endpoints in a cluster. Normalization can be important where the rate of incoming workloads varies and lags. In this circumstance, it is possible that one endpoint can be assigned a disproportionate number of workloads in round-robin fashion because an amplified pro-rate share of workloads had not yet been assigned to the endpoint causing the other endpoints not to receive any workload assignments. To remediate this condition, normalization can reduce the amplitude of workloads to be assigned to an endpoint proportionately as between the different workloads.

When normalizing weights, it can be important to preserve the ratios among the weights as much as possible. Otherwise, workloads will not be optimally distributed to the proper endpoints thereby thwarting the purpose of the load balancing exercise. It also can be important that the weights are lowered sufficiently so as to permit proper workload distribution when workload requests arrive at a varied and low rate. Nevertheless, modern load balancers cannot both normalize the weights of endpoints in a cluster while preserving optimal weights. Principally, modern load balancers cannot normalize the weights of endpoint in a cluster while preserving optimal weights because oftentimes the amplitude of workloads to be assigned to an endpoint cannot be reduced proportionately with the amplitudes of other workloads while maintaining an integer value for the weights. In consequence, modern load balancers must round up or round down thereby introducing inaccuracies in the optimal weighting scheme.

SUMMARY OF THE INVENTION

The present invention addresses the deficiencies of the art in respect to load balancing and provides a novel and non-obvious method, system and apparatus for load balancing workloads in a cluster according to an iterative greatest common divisor approach to weight normalization. A load balancing method can include computing a greatest common divisor for a set of current normalized values for raw weights corresponding to endpoints in a cluster. Each of the current normalized values can be reduced by a factor proportionate to the greatest common divisor. The reduction can produce new normalized values for the raw weights corresponding to the endpoints in the cluster. The computing, reducing and assigning steps can be repeated for the new normalized values until the new normalized values are sufficiently low. Finally, workloads can be assigned to the endpoints in the cluster according to the new normalized values.

The reducing step can further include, responsive to the greatest common denominator not exceeding unity, determining if the reduction produces an odd value. Further responsive to the reduction producing an odd value, the odd value can be corrected to an even value in a direction opposite to a direction of a previous correction. For example, the correcting step can include consulting a cache to identify a direction of a previous correction and changing the odd value to an even value in a direction opposite to the direct of the previous correction. Finally, the repeating step can include, responsive to the greatest common divisor exceeding unity, repeating the computing and reducing steps for the new normalized values.

A load balancer which has been configured in accordance with the present invention can include a set of raw weights assigned to corresponding endpoints in a communicatively coupled cluster, a set of initially established normalized values for the raw weights, and weight normalization logic programmed to iteratively reduce the initially established normalized values by a greatest common divisor for the normalized values. The load balancer also can include one or more cached directions of corrections for corresponding ones of the normalized values. In this regard, the weight normalization logic can include additional programming to correct odd values of individual reduced ones of the normalized values in a direction which is opposite to a cached direction for the individual reduced ones of the normalized values.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for load balancing according to an iterative greatest common divisor approach to weight normalization. In accordance with the present invention, an iterative process can be undertaken to normalize weighted values assigned to different endpoints in a cluster utilizing a greatest common divisor. Specifically, whenever a greatest common divisor of a set of normalized values does not exceed unity, the normalized value for odd normalized values can be incremented or decremented alternately in an opposite direction to a previous adjustment. In this way, the workloads processed by any one endpoint in the cluster can more accurately reflect the assigned raw weights irrespective of inaccuracies introduced by the normalization of the raw weights.

Figure 1:
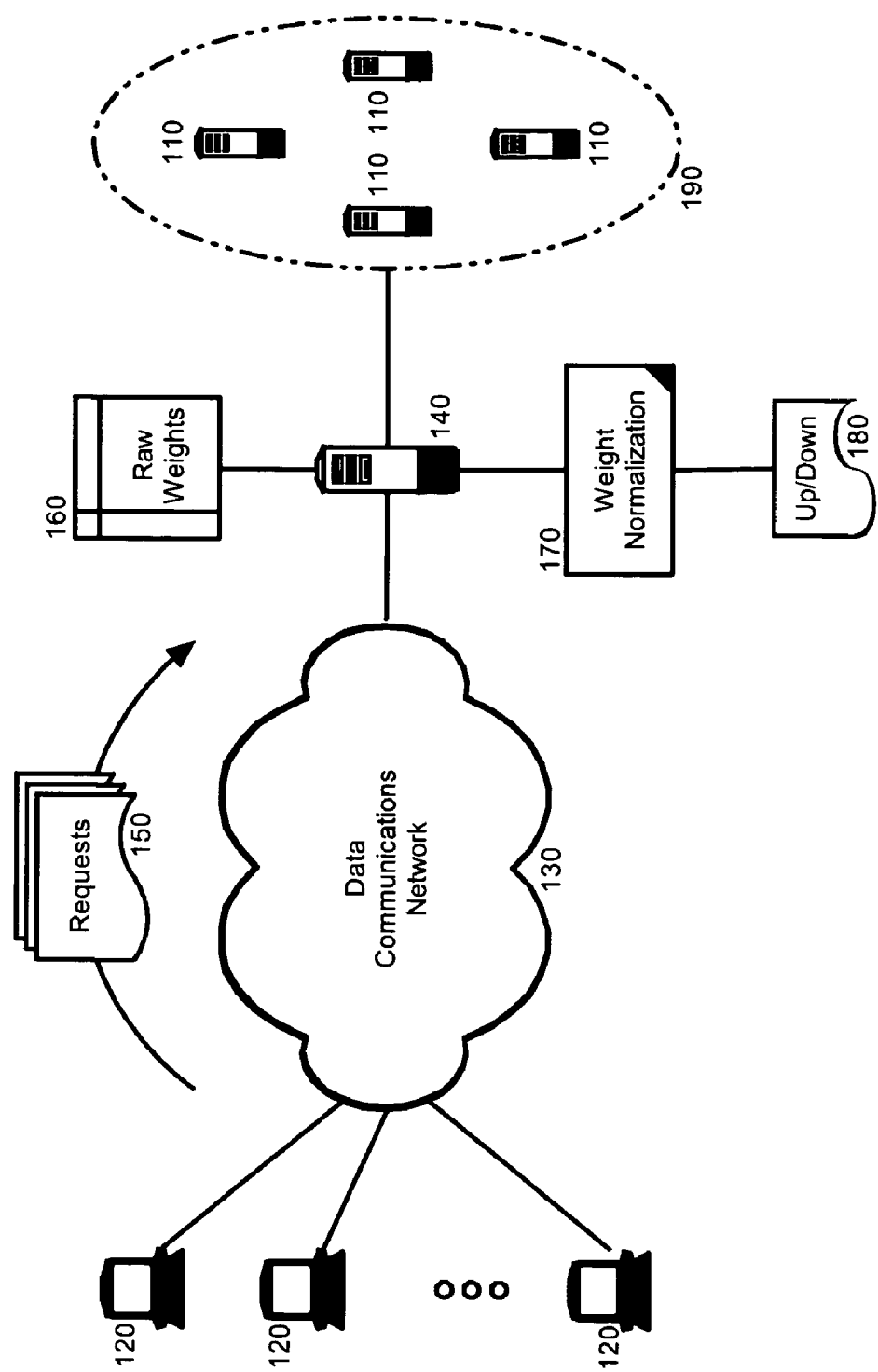
FIG. 1 is a schematic illustration of a cluster configured for load balancing according to an iterative greatest common divisor approach to weight normalization; and, FIG. 2 is a flow chart illustrating a process for load balancing workloads in a cluster according to an iterative greatest common divisor approach to weight normalization.

In more particular illustration, FIG. 1 is a schematic illustration of a cluster configured for load balancing according to an iterative greatest common divisor approach to weight normalization. As shown in FIG. 1, a cluster of servers 190 (or server processes) can be load balanced according to the load balancer 140 in order to service requests 150 from individual clients 120 over the data communications network 130. To achieve desired loads for each of the endpoints 110 in the cluster 190, a set of raw weights can be assigned to the endpoints 110. Consequently, the load balancer 140 can assign different workloads stemming from the requests 150 to different endpoints 110 in the cluster 190 according to a normalized set of values which are proportionate to one another in respect to the raw weights 160 assigned to each of the endpoints 110.

Importantly, to account for requests 150 which arrive in the load balancer 140 at a varied and low rate, weight normalization logic 170 can be coupled to the load balancer 140 in order to reduce the normalized values proportionately with respect to the raw weights 160. Unlike a conventional weight normalization process however, the weight normalization logic 170 of the present invention can perform weight normalization utilizing a greatest common divisor to optimize the normalized values in an iterative fashion and the weight normalization logic 170 further can ensure greater fidelity of weighting by correcting odd valued normalized values alternately by referencing a cached direction 180 for the correction.

Specifically, the weight normalization logic 170 can iteratively reduce the normalized value of the raw weights 160 for each endpoint 110 in the cluster 190 until a set of normalized values can be obtained which are sufficient for weighting the assignment of workloads to different endpoints 110 in the cluster 190. The reduction can be based upon a greatest common divisor for the normalized value of the raw weights 160. Whenever the greatest common divisor does not exceed unity, the normalized values can be further optimized by identifying normalized values which are odd in nature. The identified normalized values can be tuned by alternately incrementing or decrementing the identified normalized values in a direction opposite to a previous adjustment. In this way, a higher degree of fidelity can be achieved by prolonging the iterative cycle. Yet, to avoid introducing excessive inaccuracies, however, the correction of normalized values can occur in a direction opposite to that of a cached direction 180 from a prior correction.

Figure 2:
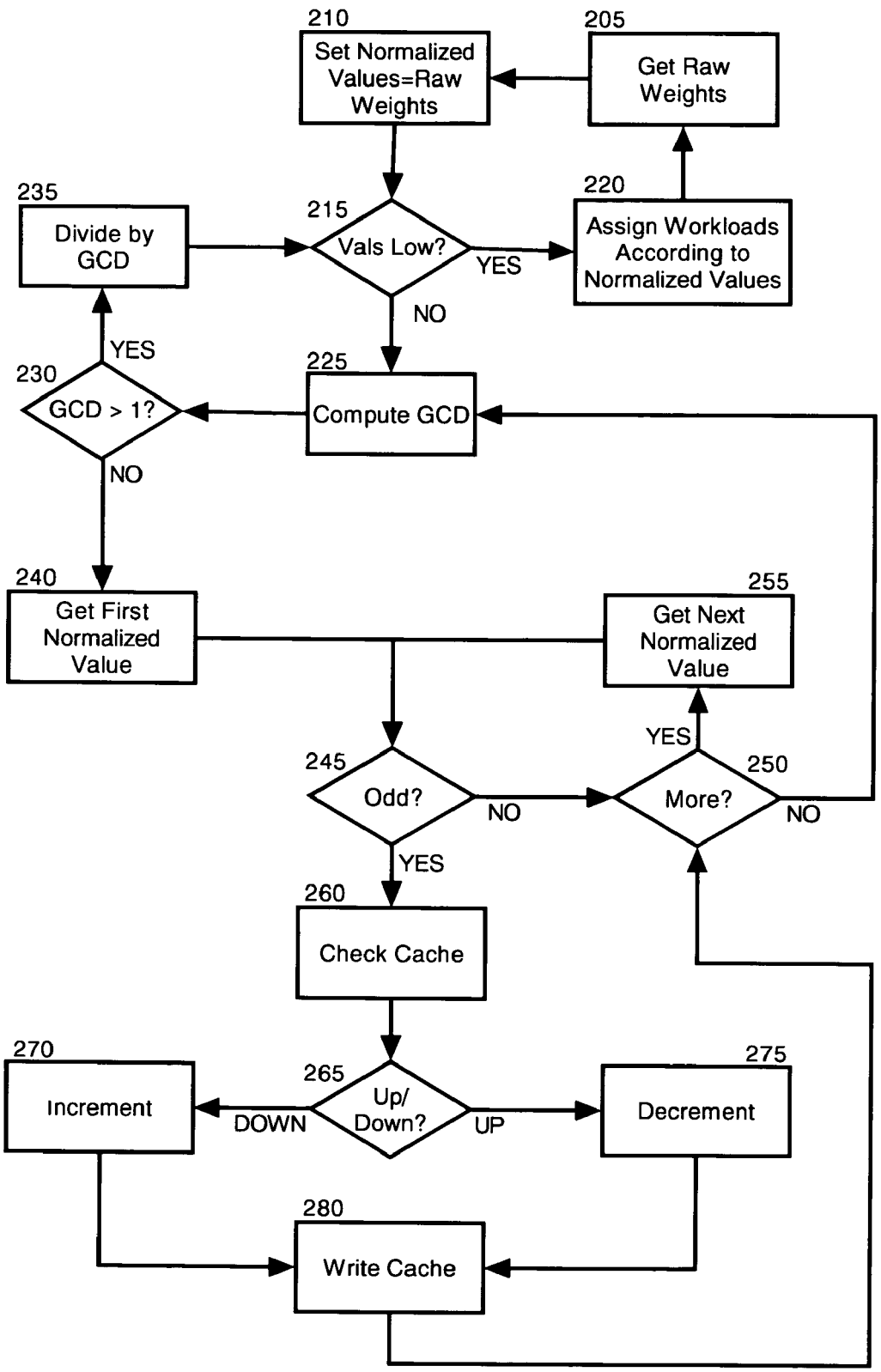

In more specific illustration, FIG. 2 is a flow chart illustrating a process for load balancing workloads in a cluster according to an iterative greatest common divisor approach to weight normalization. Beginning in block 205 a set of raw weights can be retrieved for the endpoints in a cluster. In block 210, the current normalized values can be set to the raw weights for the endpoints. In decision block 215, it can be determined whether the normalized values are sufficiently low. If so, in block 220 workloads can be assigned to the endpoints in the cluster according the normalized values for the raw weights. Otherwise, the process can continue through block 225.

In this regard, the level at which normalized values are deemed sufficiently low can be computed heuristically according to an acceptable precision loss among the ratios of the normalized values, and the minimum expected rates of arrival of workload requests which are distributed for workload balancing. Generally, the more normalization iterations which are permitted, the more precision will be sacrificed. Also, the lower the arrival rates of workload requests, the lower the normalized values should be. As an example, where the raw weights can range from the value zero to the value sixty-four, the lowest normalized value can be selected to be three and the highest normalized value can not exceed thirty-two such that the normalization iterations can cease when at least one normalized value is three or less and none are above thirty-two.

If the normalized values are not considered to be sufficiently low in decision block 215, in block 225, a greatest common divisor can be computed for the current normalized values. Subsequently, in decision block 230 it can be determined if the greatest common divisor exceeds unity. If so, in block 235 the normalized values can be divided by the greatest common divisor and the process can repeat through decision block 215. In contrast, if in block 230 the greatest common divisor does not exceed unity, the process can continue through block 240.

In block 240 the first normalized value can be retrieved for processing. In decision block 245, if the new normalized value is odd and not even, in block 260 the cache can be consulted to determine whether a previous correction direction had been set to up or down. If, in decision block 265, it is determined that a previous correction direction had been set to down, in block 270 the new normalized value can be incremented to produce an even value. Otherwise, in block 275 the new normalized value can be decremented to produce an even value. In both circumstances, in block 280 the direction of the correction can be written to the cache. Subsequently, the process can continue through decision block 250.

Importantly, the skilled artisan will recognize that each raw weight can have a corresponding cache which is independent of each other cache. Moreover, each cache can be persisted across the weight normalization cycles and each cache need not be reset at the conclusion of any one weight normalization cycle. In this way, the determination of whether or not to adjust a particular normalized value can consider the previous correction for the particular normalized value, irrespective of a particular weight normalization cycle.

Returning now to FIG. 2, if in decision block 245, the new normalized value is even and not odd, in decision block 250 it can be determined whether additional normalized values remain to be processed. If so, in block 255 a next normalized value can be retrieved and the process can repeat as before in decision block 245 until no additional normalized values remain to be processed. In that circumstance, in block 225 the greatest common divisor can be computed for the new normalized values and the process can repeat through decision block 230.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A load balancing method comprising the steps of:
    computing a greatest common divisor for a set of current normalized values for raw weights corresponding to endpoints in a cluster, wherein a weight represents a proportion of workload corresponding to an endpoint;
    reducing each of said current normalized values by a factor proportionate to said greatest common divisor, said reduction producing new normalized values for said raw weights corresponding to said endpoints in said cluster;
    repeating said computing and reducing steps for said new normalized values until said new normalized values are low enough to result in distribution of current workload among the endpoints according to said new normalized values;
    responsive to said greatest common denominator not exceeding unity, determining if said reduction produces an odd value;
    further responsive to said reduction producing an odd value, correcting said odd value to an even value in a direction opposite to a direction of a previous correction; and,
    assigning workloads to said endpoints in said cluster according to said new normalized values.

2. The method of claim 1, wherein said correcting step comprises the steps of:
    consulting a cache to identify a direction of a previous correction; and,
    changing said odd value to an even value in a direction opposite to said direct of said previous correction.

3. The method of claim 1, wherein said repeating step comprises the step of responsive to said greatest common divisor exceeding unity, repeating said computing and reducing steps for said new normalized values.

4. A computer system, comprising:
    a memory;
    at least one processor connected to the memory; and
    a load balancer executing on the at least one processor, wherein
    the memory includes:
        a set of raw weights assigned to corresponding endpoints in a communicatively coupled cluster, wherein a weight represents a proportion of workload corresponding to an endpoint;
        a set of initially established normalized values for said raw weights;
        a plurality of cached directions of corrections for corresponding ones of said normalized values;
    the processor includes:
        weight normalization logic configured to
            iteratively reduce said initially established normalized values by a greatest common divisor for said normalized values until said new normalized values are low enough to result in distribution of current workload among the endpoints according to said new normalized values, and
            correct odd values of individual reduced ones of said normalized values in a direction which is opposite to a cached direction for said individual reduced ones of said normalized values; and
        workload assignment logic configured to assign workloads to said endpoints in said cluster according to said normalized values.

5. A machine readable storage having stored thereon a computer program for load balancing endpoints in a server cluster, the computer program comprising a routine set of instructions which when executed by a machine causes the machine to perform the steps of:
    computing a greatest common divisor for a set of current normalized values for raw weights corresponding to the endpoints in a cluster, wherein a weight represents a proportion of workload corresponding to an endpoint;
    reducing each of said current normalized values by a factor proportionate to said greatest common divisor, said reduction producing new normalized values for said raw weights corresponding to said endpoints in said cluster;
    repeating said computing and reducing steps for said new normalized values until said new normalized values are low enough to result in distribution of current workload among the endpoints according to said new normalized values;

responsive to said greatest common denominator not exceeding unity, determining if said reduction produces an odd value;

further responsive to said reduction producing an odd value, correcting said odd value to an even value in a direction opposite to a direction of a previous correction; and, assigning workloads to said endpoints in said cluster according to said new normalized values.

6. The machine readable storage of claim 5, wherein said correcting step comprises the steps of:

consulting a cache to identify a direction of a previous correction; and, changing said odd value to an even value in a direction opposite to said direct of said previous correction.

7. The machine readable storage of claim 5, wherein said repeating step comprises the step of responsive to said greatest common divisor exceeding unity, repeating said computing and reducing steps for said new normalized values.

* * * * *